(12) United States Patent
Kassa et al.

(10) Patent No.: US 8,236,128 B2
(45) Date of Patent: Aug. 7, 2012

(54) ADHESIVE MATERIALS, ADHESIVE PARTS FORMED THEREWITH AND THEIR USES

(75) Inventors: Abraham Kassa, Shelby Township, MI (US); Christopher Hable, Romeo, MI (US); Terry Finerman, Washington Township, MI (US)

(73) Assignee: Zephyros, Inc., Romeo, MI (US)

( * ) Notice: Subject to any disclaimer, the term of this patent is extended or adjusted under 35 U.S.C. 154(b) by 765 days.

(21) Appl. No.: 11/871,523

(22) Filed: Oct. 12, 2007

(65) Prior Publication Data

US 2008/0254214 A1  Oct. 16, 2008

Related U.S. Application Data (60) Provisional application No. 60/863,034, filed on Oct. 26, 2006.

(51) Int. Cl.
*C04B 37/00* (2006.01)
*B05D 5/10* (2006.01)

(52) U.S. Cl. ...................... 156/325; 427/207.1
(58) Field of Classification Search .................. 156/325; 427/207.1
See application file for complete search history.

(56) References Cited

U.S. PATENT DOCUMENTS

| | | |
|---|---|---|
| 4,995,545 A | 2/1991 | Wycech |
| 5,047,451 A | 9/1991 | Barrett |
| 5,240,645 A | 8/1993 | Strecker |
| 5,964,979 A | 10/1999 | George |
| 5,985,435 A | 11/1999 | Czaplicki |
| 6,033,300 A | 3/2000 | Schneider |
| 6,096,403 A | 8/2000 | Wycech |
| 6,099,948 A | 8/2000 | Paver, Jr. |
| 6,174,932 B1 | 1/2001 | Pachl |
| 6,189,953 B1 | 2/2001 | Wycech |
| 6,237,304 B1 | 5/2001 | Wycech |
| 6,277,898 B1 | 8/2001 | Pachl |
| 6,284,360 B1 | 9/2001 | Johnson |
| 6,287,666 B1 | 9/2001 | Wycech |
| 6,287,669 B1 | 9/2001 | George |
| 6,330,893 B1 | 12/2001 | O'Connell |
| 6,372,827 B2 | 4/2002 | Johnson |
| 6,406,782 B2 | 6/2002 | Johnson |
| 6,461,691 B1 | 10/2002 | Taylor |
| 6,467,834 B1 | 10/2002 | Barz |
| 6,475,577 B1 | 11/2002 | Hopton |
| 6,486,256 B1 | 11/2002 | Tarbutton |
| 6,502,821 B2 | 1/2003 | Schneider |
| 6,506,494 B2 | 1/2003 | Brandys |

(Continued)

FOREIGN PATENT DOCUMENTS

DE   2007 050 875 A1   4/2008

(Continued)

OTHER PUBLICATIONS

Copending German Patent Application Serial No. 2007050875.3; filed Oct. 24, 2007, published as DE 2007050875 on Apr. 30, 2008.

*Primary Examiner* — Michael Orlando
(74) *Attorney, Agent, or Firm* — Dobrusin & Thennisch PC (57) ABSTRACT

Adhesive material and adhesive parts are formed according to the present invention along with used therefore. The adhesive parts typically include a handling layer.

14 Claims, 2 Drawing Sheets

U.S. PATENT DOCUMENTS

| | | |
|---|---|---|
| 6,546,693 B2 | 4/2003 | Wycech |
| 6,561,571 B1 | 5/2003 | Brennecke |
| RE38,157 E | 6/2003 | Schneider |
| 6,582,824 B1 | 6/2003 | Weigl |
| 6,588,830 B1 | 7/2003 | Schmidt |
| 6,602,156 B2 | 8/2003 | Schlueter, Jr. |
| 6,619,727 B1 | 9/2003 | Barz |
| 6,620,365 B1 | 9/2003 | Odoi |
| 6,620,501 B1 | 9/2003 | Kassa |
| 6,692,347 B1 | 2/2004 | Schneider |
| 6,733,040 B1 | 5/2004 | Simboli |
| 6,742,258 B2 | 6/2004 | Tarbutton |
| 6,750,274 B2 | 6/2004 | Gray et al. |
| 6,787,607 B2 | 9/2004 | Sahnoune |
| 6,793,274 B2 | 9/2004 | Riley |
| 6,811,864 B2 | 11/2004 | Czaplicki |
| 6,858,260 B2 | 2/2005 | Taylor |
| 6,921,130 B2 | 7/2005 | Barz |
| 6,938,947 B2 | 9/2005 | Barz |
| 6,991,237 B2 | 1/2006 | Kassa |
| 7,125,461 B2 | 10/2006 | Czaplicki et al. |
| 7,175,204 B2 | 2/2007 | Tarbutton |
| 7,180,027 B2 | 2/2007 | Hable et al. |
| 7,249,415 B2 | 7/2007 | Larsen et al. |
| 7,318,873 B2 | 1/2008 | Czaplicki et al. |
| 7,392,929 B1 | 7/2008 | Finerman et al. |
| 2001/0051260 A1 | 12/2001 | Johnson |
| 2002/0076566 A1* | 6/2002 | Brandys et al. ............... 428/458 |
| 2003/0045620 A1 | 3/2003 | Carlson |
| 2003/0050375 A1 | 3/2003 | Carlson |
| 2003/0140671 A1 | 7/2003 | Lande |
| 2003/0144416 A1 | 7/2003 | Tarbutton |
| 2003/0194548 A1 | 10/2003 | McLeod |
| 2004/0033344 A1 | 2/2004 | Czaplicki |
| 2004/0041429 A1 | 3/2004 | McLaren |
| 2004/0045250 A1 | 3/2004 | Takeuchi |
| 2004/0048060 A1 | 3/2004 | Kassa |
| 2004/0076831 A1 | 4/2004 | Hable |
| 2004/0112531 A1 | 6/2004 | Bogert |
| 2004/0176515 A1 | 9/2004 | Gray |
| 2004/0180206 A1 | 9/2004 | Czaplicki |
| 2004/0185767 A1 | 9/2004 | Schneider |
| 2004/0204551 A1 | 10/2004 | Czaplicki |
| 2004/0260012 A1 | 12/2004 | Krabbenborg |
| 2004/0262853 A1 | 12/2004 | Larsen et al. |
| 2004/0266898 A1 | 12/2004 | Kassa |
| 2005/0027042 A1 | 2/2005 | Pawlik |
| 2005/0043488 A1 | 2/2005 | Sahnoune |
| 2005/0087899 A1 | 4/2005 | Coon |
| 2005/0217785 A1 | 10/2005 | Hable |
| 2005/0221046 A1 | 10/2005 | Finerman |
| 2005/0230027 A1 | 10/2005 | Kassa et al. |
| 2005/0260399 A1 | 11/2005 | Finerman |
| 2005/0266237 A1 | 12/2005 | Asthana |
| 2005/0269840 A1 | 12/2005 | Finerman |
| 2006/0020076 A1 | 1/2006 | Finerman |
| 2006/0090343 A1 | 5/2006 | Riley |
| 2007/0193171 A1 | 8/2007 | Finerman |
| 2008/0029214 A1 | 2/2008 | Hable |
| 2008/0060742 A1 | 3/2008 | Sheasley et al. |
| 2008/0061602 A1 | 3/2008 | Czaplicki |
| 2008/0179913 A1 | 7/2008 | Coon |
| 2008/0226866 A1 | 9/2008 | Vilcek |
| 2008/0254214 A1 | 10/2008 | Kassa et al. |
| 2010/0289242 A1 | 11/2010 | Nitsche et al. |

FOREIGN PATENT DOCUMENTS

| | | |
|---|---|---|
| EP | 0 891 918 B1 | 2/2001 |
| EP | 0 893 331 B1 | 3/2001 |
| EP | 1 122 156 B1 | 8/2001 |
| EP | 1 378 421 A1 | 1/2004 |
| EP | 1 240 166 B1 | 2/2004 |
| EP | 1 252 217 | 8/2004 |
| EP | 1 001 893 B1 | 11/2004 |
| WO | 99/08899 | 2/1999 |
| WO | 99/08901 | 2/1999 |
| WO | 00/43253 A1 | 7/2000 |
| WO | 01/56845 | 8/2001 |
| WO | 03/089221 A1 | 10/2003 |

\* cited by examiner

ADHESIVE MATERIALS, ADHESIVE PARTS FORMED THEREWITH AND THEIR USES

CLAIM OF PRIORITY

This application claims the benefit of the filing dates of U.S. provisional application Nos. 60/863,034, filed Oct. 26, 2006.

FIELD OF THE INVENTION

The present invention relates to adhesive materials, adhesive parts and uses for those materials and parts in providing sealing, baffling, reinforcement, structural adhesion, combinations thereof or the like.

BACKGROUND OF THE INVENTION

For many years, industry has been concerned with designing and providing adhesive materials for providing baffling, sealing, noise/vibration reduction, reinforcement, structural attachment or the like to articles of manufacture such as automotive vehicles. More recently, it has become important to apply these materials in a condition that makes the materials more adaptable to further processing or assembly of the articles of manufacture. As an example, it can be desirable to apply an adhesive material to a member such that the material is in a condition suitable for allowing welding of the member. Thus, the present invention provides an adhesive material or adhesive part to a member in a condition that makes the member, the material or both suitable for further processing or assembly.

SUMMARY OF THE INVENTION

According to a method of the present invention an adhesive part is formed for providing sealing, structural adhesion, baffling, reinforcement or a combination thereof to the member. An adhesive material is provided and a surface material is applied to the adhesive material for forming an adhesive part with a handling surface. The adhesive material typically includes a curing agent. The adhesive material can also include one or more epoxy resins, one or more ethylene polymers or both.

In one embodiment the surface material is a scrim formed of polymeric fibers. The polymeric fibers can formed of a material having a melting point or softening between about 45° C. and about 150° C., a weight between about 15 and about 40 g/yd$^2$ or both. The scrim material can be melt blown or melt spun. The polymeric fibers of the scrim material can be formed of polyester or polyamide.

Additionally or alternatively, the adhesive material can have a viscosity of at least about 100 poise and less than about 1500 poise at a temperature of 45° C. and a shear rate of 400 1/s such that the adhesive material is more easily displaceable, for example, during a weld operation. The adhesive part can be applied to a surface of the member and that member can be part of an automotive vehicle. Typically the adhesive material is activatable to cure and/or crosslink.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon the provision of an adhesive material and applications for the adhesive material. The adhesive material is typically an activatable material meaning that the adhesive material can be activated to melt, adhere, foam, expand, cure, thermoset or any combination thereof, although not necessarily required. Such activation is typically brought about by exposure of the adhesive material to a condition such as heat, radiation, moisture or the like. The material may be applied to members or substrates of members or components of various articles of manufacture such as boats, trains, buildings, appliances, homes, furniture or the like. It has been found, however, that the method is particularly suitable for application to members of automotive vehicles. Generally, it is contemplated that the material may be applied to various members such as members that are part of a body, a frame, an engine, a hood, a trunk, a bumper, combinations thereof or the like of an automotive vehicle. It is also contemplated that the adhesive material may be applied to a carrier for forming a reinforcement, a baffle, a seal, a combination thereof or the like for the automotive vehicle. Advantageously, the adhesive material, due to its chemical formulation, its configuration or the like, can allow for more effective processing and manufacture of the material itself and/or the processing and manufacture of the articles to which the material is applied. It should be understood that percentages of ingredients for the present invention are weight percentages unless otherwise specified.

The adhesive material may have a polymeric formulation that includes or is based upon one or more of an epoxy, an acrylate, an acetate, an ethylene polymer (e.g., copolymer), an elastomer, a combination thereof or the like. It shall be recognized that, depending upon the application, a number of baffling, sealing, structural reinforcing, adhesive (e.g., for structural adhesion) or other materials, which may be expandable (e.g., foamable) or non-expandable, may be formulated in accordance with the present invention. A typical material includes a polymeric base material which, when compounded with appropriate ingredients (typically a blowing a curing agent or both), activates (e.g., expands, foams, softens, cures, cross-links or a combination thereof) in a reliable and predictable manner upon the application of heat or the occurrence of a particular ambient condition. From a chemical standpoint for a thermally-activated material, which may be structural, sealing or acoustical, can be initially processed as a flowable material before curing, and upon curing, the material will typically cross-link making the material incapable of further flow.

The adhesive material of the present invention has been found particularly useful for applications including sealing and/or structural reinforcement and/or adhesion. Generally, the activatable material may expand to at least about 101%, at least about 300%, at least about 500%, at least about 800%, at least about 1100%, at least about 1500%, at least about 2000%, at least about 2500% or at least about 3000% its original or unexpanded volume. For structural applications, expansion of the adhesive material is typically small if there is any expansion at all. Typically, an adhesive structural material of the present invention might expand, due to foaming, to a volume that is 101% to about 300% of the volume of the material prior to expansion. A sealing adhesive material might expand to a volume that is 500% to 4000% of the volume of the material prior to expansion. Of course higher or lower expansion levels are within the scope of the present invention unless otherwise specifically stated.

In applications where the adhesive material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile components at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

As suggested, it is contemplated that the adhesive material may be formed of a variety of ingredients. Generally, the adhesive material can include any combination of following components:

1) one or more epoxy resins;
2) one or more ethylene polymers (e.g., copolymers) and/or one or more acrylates or acetates;
3) one or more elastomer or elastomer containing materials such as epoxy/elastomer adducts;
4) one or more blowing agents and/or blowing agent accelerators;
5) one or more curing agents and/or curing agent accelerators;
6) one or more fillers;
7) additional polymeric materials or other additives;

Epoxy Resin

Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction.

The epoxy may be aliphatic, cycloaliphatic, aromatic or the like. The epoxy may be supplied as a solid (e.g., as pellets, chunks, pieces or the like), a liquid (e.g., an epoxy resin that is liquid at 23° C.) or a combination thereof. Typically, although not necessarily required, the adhesive material will include an amount of epoxy resin that is liquid and/or semi-solid at 23° C. sufficient to impart tack and/or pressure sensitivity to the adhesive material at the same temperature.

The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the adhesive material to increase adhesion properties of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

It is generally contemplated that the adhesive material of the present invention can include any amount of epoxy resin and can be substantially entirely or entirely without epoxy resin. Epoxy resin can be particularly desirable if the adhesive material is to exhibit relatively high strength (e.g., cohesive strength, compressive strength, adhesive strength, lap shear strength or the like) typically for structural adhesion reinforcement. In such embodiments, the adhesive material can include up to about 80% of an epoxy resin or more. More typically, the adhesive material will include between about 10% and 70% by weight epoxy resin and still more typically between about 30% and 50% by weight epoxy resin.

In some embodiments and depending upon desired properties such as glass transition temperature of the adhesive material, one or more of the epoxy resins employed in the adhesive material are multifunctional and/or have relatively high functionalities (e.g., epoxy functionalities). When such relatively high functionality resins are employed, it is typically desirable for at least 5%, more typically at least 10% and even more typically at least 15% or even at least 20% of the epoxy resins have a functionality that is greater than about 2 (e.g., about 2.6 or greater), more typically greater than about 3 (e.g., about 3.6 or greater) and still more typically greater than about 4.5 (e.g., about 5.1 or greater). Generally speaking, when the functionalities are higher, it is typical that less of the higher functionality material is required to achieve desired performance. Advantageously, such higher functionality can, in certain instances, provide for improved high temperature performance, improved lap shear strength or a combination thereof. While not required, it can be desirable to have at least 30% and more typically at least 60% of any total amount of epoxy resin employed to be liquid epoxy resin.

Elastomers and Elastomer Adducts

Generally, the adhesive material can include one or more of a variety of elastomeric materials, which may be independently admixed into the adhesive material or may be added as part of a material (e.g., as an adduct or a modified polymer). Exemplary suitable elastomers include, without limitation, natural rubber, styrene-butadiene rubber, polyisoprene, polyisobutylene, polybutadiene, isoprene-butadiene copolymer, neoprene, butyl rubber, polysulfide elastomer, acrylic elastomer, acrylonitrile elastomers, silicone rubber, polysiloxanes, polyester rubber, polyurethane rubber, diisocyanate-linked condensation elastomer, EPDM (ethylene-propylene diene rubbers), chlorosulphonated polyethylene, fluorinated hydrocarbons and the like In a highly preferred embodiment, one or more elastomer-containing adducts are employed in the adhesive material of the present invention, and preferably in a relatively high concentration (e.g., on the order of the epoxy resin, when used). Epoxy/elastomer hybrid or reaction product may be included in an amount of up to about 80% by weight of the adhesive material. More preferably, an elastomer-containing adduct is approximately 20 to 60%, and more preferably is about 35% to 55% by weight of the adhesive material. Of course, the elastomer-containing adduct may be a combination of two or more particular adducts and the adducts may be solid adducts or liquid adducts at a temperature of 23° C. or may also be combinations thereof.

The adduct itself generally includes about 1:5 to 5:1 parts of epoxy to elastomer, and more preferably about 1:3 to 3:1 parts or epoxy to elastomer. More typically, the adduct includes at least about 5%, more typically at least about 12% and even more typically at least about 18% by weight elastomer and also typically includes not greater than about 50%, even more typically no greater than about 40% and still more typically no greater than about 30% by weight elastomer, although higher or lower percentages are possible. For liquid adducts it is often the case that the adducts include more elastomer as compared solid adducts. The elastomer containing adduct may include any suitable art disclosed elastomer such as those listed above or other. In one embodiment, recycled tire rubber is employed. Examples of additional or alternative epoxy/elastomer or other adducts suitable for use in the present invention are disclosed in U.S. Patent Publication 2004/0204551, which is incorporated herein by reference for all purposes. On desirable elastomer for the adduct is a carboxyl terminated butadiene acrylonitrile rubber such as those sold under the tradename HYCAR, which are commercially available from Emerald Performance Materials.

The elastomer-containing adduct, when added to the adhesive material, preferably is added to modify structural properties of the adhesive material such as strength, toughness, stiffness, flexural modulus, or the like. Additionally, the elastomer-containing adduct may be selected to render the adhesive material more compatible with coatings such as water-borne paint or primer system or other conventional coatings.

For an epoxy/elastomer adduct, the elastomer portion of the adduct may be solid or liquid and the epoxy portion of the adduct may be solid or liquid. Thus solid epoxy/solid elastomer, solid epoxy/liquid elastomer, liquid epoxy/solid elastomer and liquid epoxy/liquid elastomer adducts and any combination thereof may be employed. According to one preferred embodiment, the adhesive material includes a portion of one or more liquid adducts (i.e., liquid at a temperature of about 23° C.) and a portion of one or more solid adducts (i.e., solid at a temperature of about 23° C.) for assisting in improving properties such as impact strength, peel strength, combinations thereof or others. Thus, in one embodiment, it is contemplated that for all adducts in the adhesive material, at least about 15% by weight, more typically at least about 25% by weight and even possibly at least about 35% or at least about 60% by weight of the adducts (i.e., the components of the adducts) are liquid.

Blowing Agent

One or more blowing agents may be added to the adhesive material. The blowing agents may be chemical and produce inert gasses that form, as desired, an open and/or closed cellular structure within the adhesive material or may be physical and either may be activated upon exposure to a condition such as heat, radiation, moisture, chemical reaction, combinations thereof or the like. In this manner, it may be possible to lower the density of articles fabricated from the material. In addition, the material expansion helps to improve sealing capability, substrate wetting ability, adhesion to a substrate, acoustic damping, combinations thereof or the like.

The blowing agent may include one or more nitrogen containing groups such as amides, amines and the like. Examples of suitable blowing agents include azodicarbonamide, dinitrosopentamethylenetetramine, 4,4$_i$-oxy-bis-(benzenesulphonylhydrazide), trihydrazinotriazine and N, N$_i$-dimethyl-N,N$_i$-dinitrosoterephthalamide. Other potential blowing agents include solvent encapsulated in thermoplastic shells.

An accelerator for the blowing agents may also be provided in the adhesive material. Various accelerators may be used to increase the rate at which the blowing agents form inert gasses. One preferred blowing agent accelerator is a metal salt, or is an oxide, e.g. a metal oxide, such as zinc oxide. Other preferred accelerators include weak bases, tertiary amines, modified and unmodified thiazoles and imidazoles, combinations thereof or the like.

Amounts of blowing agents and blowing agent accelerators can vary widely within the adhesive material depending upon the type of cellular structure desired, the desired amount of expansion (e.g., foaming) of the adhesive material, the desired rate of expansion, desired cure conditions and the like. Exemplary ranges for the amounts of blowing agents and blowing agent accelerators in the adhesive material range from about 0.001% by weight to about 5% by weight and even up to about 10% by weight and, for structural adhesive materials, are preferably in fractions of weight percentages.

In one embodiment, the present invention contemplates the omission of a blowing agent. Thus it is possible that the material will not be a foamable material. Preferably, the formulation of the present invention is thermally activated. However, other agents may be employed for realizing activation by other means, such as moisture, radiation, or otherwise.

Curing Agent

One or more curing agents and/or curing agent accelerators may be added to the adhesive material. Amounts of curing agents and curing agent accelerators can, like the blowing agents, vary widely within the adhesive material depending upon the type of cellular structure desired, the desired amount of expansion of the adhesive material, the desired rate of expansion, the desired structural properties of the adhesive material, the desired cure conditions (e.g., manufacturing conditions) and the like. Exemplary ranges for the curing agents or curing agent accelerators present in the adhesive material range from about 0.01% by weight to about 7% by weight.

Preferably, the curing agents assist the adhesive material in curing by crosslinking of the epoxy containing adducts, epoxy resins, other polymers or a combination thereof. It is also preferable for the curing agents to assist in thermosetting the adhesive material. Useful classes of curing agents are materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, hydrazides, sulphones (e.g., diamino diphenyl sulphone (DDS)), dicyandiamides and the like. An accelerator for the curing agents (e.g., a modified or unmodified urea such as methylene diphenyl bis urea, an imidazole or a combination thereof) may also be provided for preparing the adhesive material. Desirable curing agents can also include peroxide or peroxide based ingredients and/or sulfur or sulfur based ingredients depending upon the polymers to be cured.

Desirable cure times can vary depending upon manufacturing processes and other factors. Moreover, such curing times can depend upon whether additional energy (e.g., heat, light, radiation) is applied to the material or whether the material is cured at room temperature.

Filler

The adhesive material may also include one or more fillers, including but not limited to particulated materials (e.g., powder), beads, microspheres, or the like. Preferably the filler includes a relatively low-density material that is generally non-reactive with the other components present in the adhesive material.

Examples of fillers include silica, diatomaceous earth, glass, clay, talc, pigments, colorants, glass beads or bubbles, glass, carbon ceramic fibers, and the like. Such fillers, particularly clays, can assist the adhesive material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, wollastonite, pyrophyllite, sauconite, saponite, nontronite, montmorillonite or mixtures thereof. The clays may also include minor amounts of other ingredients such as carbonates, feldspars, micas and quartz. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, aramid fiber, silicate minerals and mica in particular improved the impact resistance of the cured adhesive material.

When employed, the fillers in the adhesive material can range from 2% to 90% by weight of the adhesive material. According to some embodiments, the adhesive material may include from about 0.001% to about 30% by weight, and more preferably about 10% to about 20% or about 3 to about 10% by weight clays or similar fillers. Powdered (e.g. about 0.01 to about 50, and more preferably about 1 to 25 micron mean particle diameter) mineral type filler or other fillers can comprise between about 1% and 70% by weight, more preferably about 3% to about 20%, and still more preferably approximately 6% by weight of the adhesive material.

It is contemplated that one of the fillers or other components of the material may be thixotropic for assisting in controlling flow of the material as well as properties such as tensile, compressive or shear strength.

It is also contemplated that the activatable material may include one or more conductive materials, which can assist in weld-through of the material. Examples of such materials includes graphite, carbon-black, iron phosphide, metal particulate (e.g., pellets, shavings or the like), combinations thereof or the like. When used, such conductive material typically comprise at least about 1%, more typically at least about 5% and even possibly at least about 10% by weight of the adhesive material and also typically comprise less than about 40%, more typically less that about 25% and even more typically less than about 15% by weight of the adhesive material, although higher or lower amounts may be used.

Ethylene Polymers (e.g., Copolymers), Acrylates and Acetates

Generally, the adhesive material can include one or more polymers selected from ethylene polymers (e.g., copolymers or terpolymers), acrylates and acetates or combinations thereof. Suitable acrylates include, for example, simple acrylate, methyl acrylate, ethyl acrylate, butyl acrylate, vinyl acrylate, copolymers or combinations thereof or the like, which may be compounded with ethylene (e.g, ethylene methyl acrylate). Suitable acetates may include, for example, acetate, methyl acetate, ethyl acetate, butyl acetate, vinyl acetate, copolymers or combinations thereof or the like, which may be compounded with ethylene (e.g, ethylene vinyl acetate).

Other Additives

Other additives (e.g., polymers, agents or performance modifiers) may also be included in the adhesive material as desired, including but not limited to a UV resistant agent, a flame retardant, antioxidants, an impact modifier, a heat stabilizer, a UV photoinitiator, a colorant, a processing aid, a lubricant, a reinforcement (e.g., chopped or continuous glass, ceramic, aramid (e.g., aramid pulp), or carbon fiber or the like). Additional additive can include, without limitation, ammonium chlorides such as dimethyl ammonium chloride and dimethyl benzyl chloride Structural Adhesive Material One exemplary formulation for a preferred adhesive material (e.g., a structural adhesion or reinforcement material) having desirable structural properties is provided below as table A:

TABLE A

| Ingredients | Weight Percentages |
|---|---|
| Solid Epoxy/Liquid Rubber Adduct | 14.4 |
| EMA-GMA terpolymer | 7.0 |
| Nanoclay | 2.8 |
| Solid Epoxy | 7.2 |
| Liquid Epoxy/Liquid Rubber Adduct | 10.8 |
| Liquid Epoxy | 28 |
| Dicyandiamide | 3.1 |
| Modified Urea | 0.8 |
| Calcined Clay | 18.74 |
| Blowing Agent | 0.1 |
| Castor Wax | 2 |
| Graphite | 5 |
| Carbon Black | 0.06 |

It should be understood that the amounts listed in table A are meant to be exemplary and can vary by ±0.5 weight percentage points, ±2 weight percentage points, ±10 weight percentage points, ±20 weight percentage points or more. It should be further understood that the amounts listed in table A are meant to be exemplary and can vary by ±0.5%, ±2%, ±10%, ±20%, ±40% of their listed values or more. For example, a weight percent of 10±20% results in a range from 8% to 12% by weight.

Sealing Adhesive Material

Exemplary formulations for other preferred adhesive materials (e.g., sealing or baffling adhesive materials) are provided below as table B1 and B2:

TABLE B1

| Chemical Name | Percent of Formula |
|---|---|
| Masterbatch | 20.66 |
| Brominated Olefin Polymer (19.36%) | |
| Ethylene Propylene Ethylidene Norbornene Terpolymer (14.52%) | |
| P-Aramide (0.773%) | |
| Ethylene-propylene dicyclopentadiene rubber (21.783%) | |
| Ethylene Propylene Copolymer (9.684%) | |
| 2-Propenoic acid, butyl ester, polymer with ethane (33.88%) | |
| Modified Polyterpene Type Hydrocarbon Resin | 9.00 |
| Azodicarbonamide | 4.50 |
| Hydrocarbon Resin | 3.90 |
| Strontium Ferrite | 33.34 |
| Zinc Oxide, Nonferrous Metal Oxide | 2.00 |
| Dipentaeythritol Pentaacrylate (30%) | 2.0 |
| Strontium Ferrite (63%) & Silicon Dioxide (7%) | |
| 1,1-bis(t-butylperoxy)-3,3,5-trimethyl cyclohexane, carbonic acid calcium salt & calcium silicate | 1.20 |
| Dibenzoyl Peroxide & Dicyclohexyl Phthalate | 0.40 |
| Polybutene (Isobutylene/butane copolymer) | 14.00 |
| Solvent Refined Petroleum Hydrocarbon Oil | 9.00 |
| Total | 100 |

TABLE B2

| Chemical Name | Percent of Formula |
|---|---|
| Ethylene Propylene Copolymer | 9.00 |
| Ethylene Propylene Ethylidene Norbornene Terpolymer | 6.00 |
| Polybutadiene-Maleic Anhydride Adduct & Dydrated Amorphous Silica | 1.20 |
| Carbon Black | 9.00 |
| calcium Carbonate | 2.30 |

TABLE B2-continued

| Chemical Name | Percent of Formula |
|---|---|
| Solvent Refined Petroleum Hydrocarbon Oil | 14.10 |
| Polybutene (Isobutylene/butane copolymer) | 10.50 |
| Modified Polyterpene Type Hydrocarbon Resin | 1.70 |
| Oxidized Polyethylene Homopolymers | 2.00 |
| Iron Phosphide | 22.10 |
| Sulfur | 0.50 |
| Zinc Dibutyl Dithiocarbamate | 0.20 |
| p,p'-oxybis(benzenesulfonylhydrazide) | 0.70 |
| Ethoxylated Bisphenol A Diacrylate (70%) & Silicon Dioxide (30%) | 0.50 |
| Zinc Oxide, Nonferrous Metal Oxide | 1.50 |
| Calcium Carbonate | 18.60 |
| Aliphatic Acid | .10 |
| Total | 100 |

It should be understood that the amounts listed in table B are meant to be exemplary and can vary by ±0.5 weight percentage points, ±2 weight percentage points, ±10 weight percentage points, ±20 weight percentage points or more. It should be further understood that the amounts listed in table B are meant to be exemplary and can vary by ±0.5%, ±2%, ±10%, ±20%, ±40% of their listed values or more.

Adhesive Parts

It is contemplated that the adhesive material of the present invention may be formed into parts suitable for application to a surface of a member of an article of manufacture. Formation of adhesive parts generally includes provision of masses of the adhesive material in a form suitable for application to the surface of a member. Such masses are typically formed by a machine or system that intermixes the components and/or emits the adhesive material. Typically, the machine emits the adhesive material continuously and the material is further cut, shaped or otherwise processed to form masses of a desired shape and configuration. It is also contemplated that the machine may emit the adhesive material as separate masses.

Figure 1:
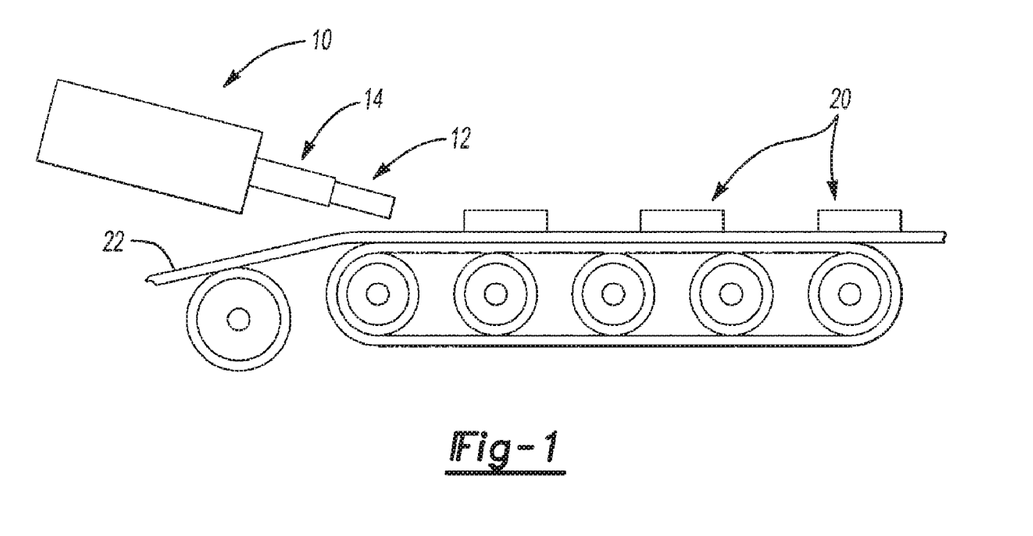
FIG. 1 illustrates the formation of adhesive parts according to one exemplary aspect of the present invention.

As one example and referring to FIG. 1, the adhesive material or ingredients thereof may be provided to a machine such as an extruder 10 (e.g., a single screw extruder, a twin screw or otherwise). The machine typically intermixes the adhesive material, heats the adhesive material or both and emits the material 12 through an opening 14 (e.g., a die opening) in a predetermined shape such as a strip or sheet. As the adhesive material 12 is emitted, it is typically cut (e.g., rotary die cut) into separate masses thereby forming adhesive parts 20. According to one preferred embodiment, the masses or parts 20 are located upon one or more release substrates. As shown in FIG. 1, a release substrate shown as release paper 22 is moved (e.g., via a turntable, a coveyor belt or the like) relative to the opening of the machine such that the parts 20 are located and space apart upon the paper 22.

Generally, it is contemplated that the adhesive material or parts of the present invention may include a surface material or layer that is applied to the adhesive material. While it is contemplated that a surface material may be at least partially located within the adhesive material, it is typically applied to one or more surfaces of the adhesive material. Such a surface material can be useful for providing a handling surface for the adhesive part particularly when the adhesive material is relatively tacky. Generally, the adhesive materials of the present invention tend to be relatively tacky prior to activation, however, the adhesive material of the present invention may be substantially non-tacky for particular applications. The surface materials of the present invention tend to be substantially non-tacky.

The surface material of the present invention may be supplied in a variety of configurations. The surface material may be configured as, without limitation, a fabric, a film (e.g., a continuous or non-continuous film), leather, cloth, a weave, a roving, a scrim, a pattern material, combinations thereof or the like. Moreover, the surface material may be formed of a variety of materials including, without limitation, polymeric materials, fibrous or strand materials (e.g., glass fibers, carbon fibers, natural fibers, synthetic fibers, polymeric fibers), release substrates, combinations thereof or the like.

In one preferred embodiment, the surface material includes a substantial portion of one or more polymeric materials, which may be formed into a film, a fabric or other configuration discussed above or otherwise known. As used herein, the term fabric as it is applied to surface material is meant to encompass any combination of fibers or strands whether woven, unwoven, layered, intertwined, adjacent each other, agglomerated or otherwise configured.

In a preferred embodiment of the invention the backing material is provided in the form of a polymeric scrim. By scrim is meant a light weight fabric, textile or gauze composed of fiber such as singular fibers, threads, strands or yarn. Such scrims can be formed of glass fiber, polymeric fiber, carbon fiber, combinations thereof or otherwise. The scrim may be of woven or non-woven construction but those of a non-woven construction are particularly preferred. The scrim material will be of low enough weight $g/yd^2$ such that the fibers are spaced and overlapped in such a way as to leave spaces between the fibers, threads, strands or yarn. In one preferred embodiment, the scrim will exist as a discontinuous, permeable surface. It is contemplated, however, that the polymeric materials discussed below in relation to the scrim could be formed into a surface material of a different configuration such as film.

In one embodiment, the scrim includes or is formed entirely or substantially entirely of polymeric material. Polymeric material for the scrim may be crystalline, semicrystalline or amorphous. Crystalline or semi-crystalline polymeric materials suitable for use in the invention will typically have a melting point, as measured by DSC (Digital Scanning Calorimeter), between about 40° C. and about 200° C., more typically between about 45° C. and about 150° C. and even more preferably between about 50° C. and about 100° C. Amorphous polymeric materials suitable for use in the invention will have a softening point, as measured by thermo mechanical analysis (TMA) of between preferably between about 40° C. and about 200° C., more preferably between 45° C. and about 150° C. and even more preferably between 50° C. and about 100° C. It is contemplated that higher or lower softening point material may be employed within the scope of the present invention, unless otherwise stated. Generally, however, without being bound by any theory, it is believed that other materials with melting points or softening points below 40° C. may be less effective in providing reduction in tack when placed on the tacky base material and that other materials with softening points above 200° C. may provide low tack and desired handling but the scrim will not soften easily such that weld-through or other characteristics could be impaired.

The scrim material will typically have a weight per area between about 10 and about 50 $g/yd^2$, although possibly higher or lower unless otherwise stated, more typically between about 15 and about 40 $g/yd^2$ and even more typically between about 20 and about 35 $g/yd^2$. At higher weights per area, it is possible that welding or other properties could be impaired and the adhesive properties of the parts might also be diminished. Generally, lower fabric weights can be desirable for weld through products and higher weights can be desirable to achieve less stretching.

The polymeric material may be any material capable of being melt blown or melted spun to form the scrim. Exemplary polymeric materials which can be used to produce the scrim material are polymers or copolymer of polyesters, polyamides, polyolefins or the like. Exemplary scrim materials that are usable according to the invention are available sold under the trade designation PE 75-25 from Bostik under the designation of Web Adhesives.

In one additional or alternative preferred embodiment, a surface material that could be a fabric or scrim, but which is preferably provided as a continuous or discontinuous film, includes one or more polymeric materials, which typically include at least one acid polymer and more particularly at least one ethylene-acid polymer (e.g., an ethylene acetate and/or acrylic copolymer and/or terpolymer). Exemplary preferred acid polymers are ethylene acrylic acid copolymers and/or terpolymers commercially available under the tradename ESCOR AT320 from ExxonMobil or under the tradename NUCREL 960 from DuPont.

The acid polymer, when used, is typically at least about 1% by weight of the surface material although it may be less. In preferred embodiments, the acid polymer is typically at least about 4%, more typically at least about 8% and even more typically at least about 10% by weight of the surface material and is also typically no greater than about 60%, more typically no greater than about 22% and even more typically no greater than about 15% by weight of the surface material.

The surface material, particularly when it includes the acid polymer, will also typically include one or more ethylene polymers (e.g., non-acid ethylene copolymers or terpolymers) or other polymers. Examples of preferred polymers include, without limitation, ethylene vinyl acetate (EVA), ethylene methyl acrylate (EMA), combinations thereof or the like. One preferred polymer is an Ethylene Methyl Acrylate Copolymer sold under the tradename OPTEMA TC-140, commercially available from ExxonMobil. When included, such ethylene polymers are typically at least about 5% by weight of the surface material although they may be less. In preferred embodiments, the one or more ethylene polymers or other polymers are typically at least about 20%, more typically at least about 60% and even more typically at least about 75% by weight of the surface material and is also typically no greater than about 98%, more typically no greater than about 94% and even more typically no greater than about 90% by weight of the surface material.

Generally, it is contemplated that the one or more acid polymers and the one or more ethylene or other polymers can be the entirety or substantially the entirety of the surface material. However, it is additionally contemplated that the surface material, additionally or alternatively, can include most any additional suitable ingredients or additive. As examples, the surface material can include, without limitation, fillers, plasticizers, colorants, stabilizers curing agents (e.g., peroxide, which may be mixed with or supported on a material such as clay), blowing agents, tackifiers, combinations thereof or the like and such ingredients may be suitably selected from any of the ingredients discussed above with respect to the adhesive material or otherwise. In one embodiment, the surface material, which is typically a film, consists essentially of the one or more ethylene polymers, the acid polymer, curing agent, filler, tackifier or any subcombination thereof.

In one preferred embodiment, the surface material includes a conductive filler, which can assist in passing electrical current (e.g., weld current) as further discussed below. Such conductive fillers may be selected from any of the conductive fillers discussed with respect to the adhesive material and may be employed in similar or same weight percentages.

The surface material may be formed into a desired configuration according to a variety of techniques or protocols. Advantageously, the surface material of the present invention, particularly the material including the acid polymer, the ethylene or other polymer or both, can typically be re-melted or re-softened and re-processed thereby minimizing scrap. One preferred processing technique includes compounding the ingredients of the surface material and extruding the surface material with a single or twin screw extruder and then converting the surface material into a film using a cast or blown film extrusion line.

Exemplary formulations of surface materials (e.g., films) with acid polymers are in table C below:

TABLE C

| Ingredients | Weight Percentages Formula I | Weight Percentages Formula II |
|---|---|---|
| Ethylene Methyl Acrylate Copolymer | 60.00 | 56.27 |
| Dicumyl Peroxide (40%) & Kaolin Clay (60%) | 1.00 | 0.83 |
| Ethylene Methacrylic Acid Copolymer | 15.00 | |
| Terpolymer of Ethylene, Methacrylic Acid and Acrylic Acid | | 16.23 |
| Aromatic Hydrocarbon Resin | 8.00 | 6.67 |
| Calcium Carbonate | 16.00 | |
| Graphite | | 20.00 |

It should be understood that the amounts listed in table C are meant to be exemplary and can vary by ±0.5 weight percentage points, ±2 weight percentage points, ±10 weight percentage points, ±20 weight percentage points or more. It should be further understood that the amounts listed in table C are meant to be exemplary and can vary by ±0.5%, ±2%, ±10%, ±20%, ±40% of their listed values or more.

In whatever configuration the surface material is provided, it can be applied to the adhesive material using any variety of techniques such as manual layering of the surface material upon the adhesive material, coextrusion of the surface material with the adhesive material or the like.

Figure 2:
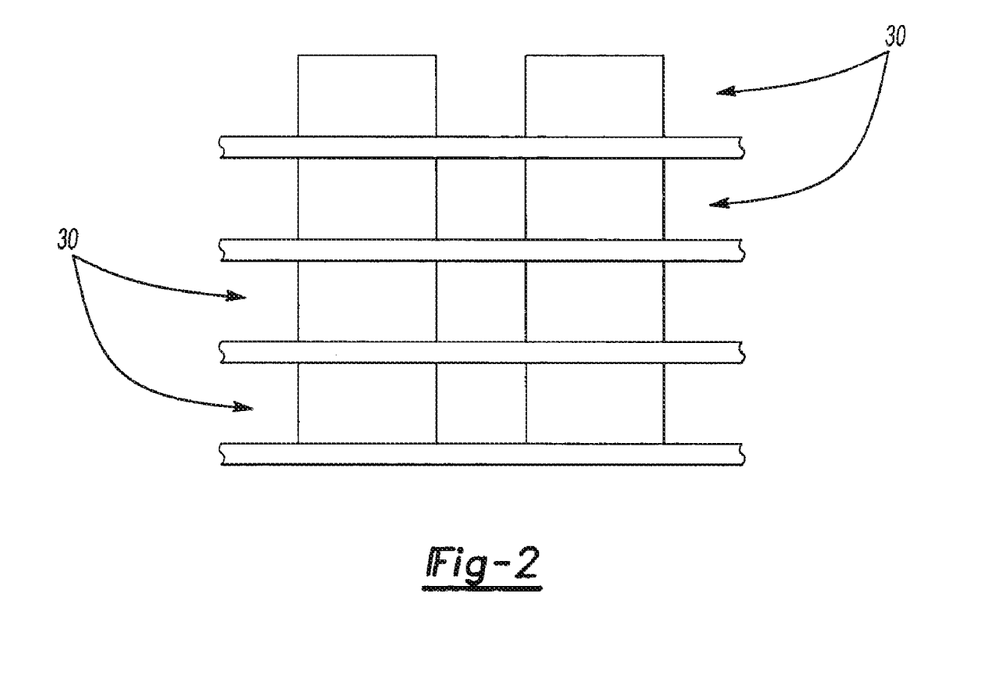
FIG. 2 illustrates the stacking of adhesive parts according to one exemplary aspect of the present invention.
Figure 3:
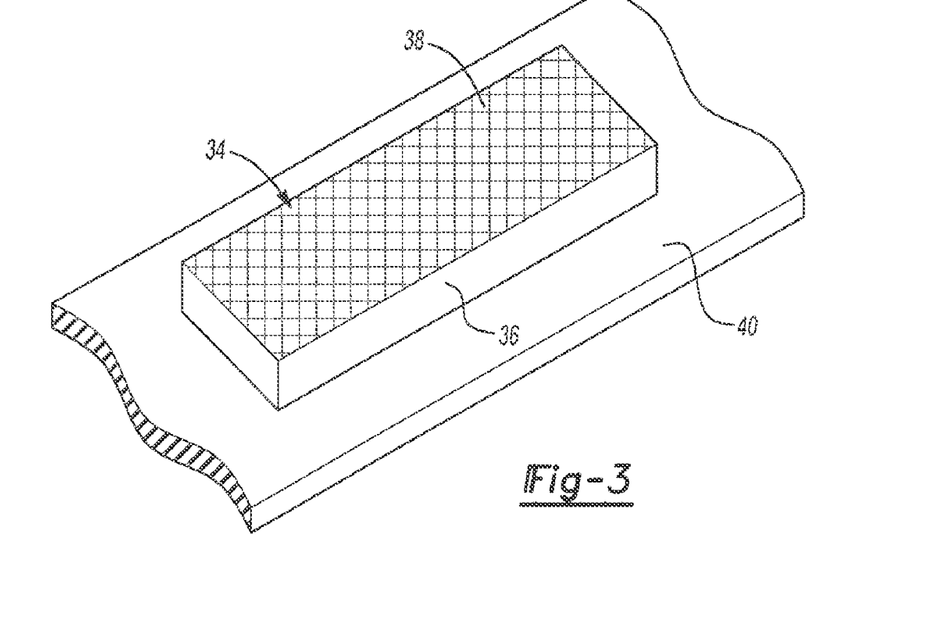
FIG. 3 illustrates an adhesive part configured according to one exemplary embodiment of the present invention.

Advantageously, the adhesive parts, as provided, are particularly suitable for transportation from one location to another location. For example, as shown in FIG. 2, parts upon release substrates can be stacked upon each other (e.g., layered at least 5, 10 or more layers 30 high) and shipped at temperatures of at least 90° F., 105° F., 110° F. or more.

FIG. 1 illustrates an exemplary adhesive part 34 that includes an adhesive material 36 and a surface material 38 applied thereto. In the particular embodiment shown, the adhesive part 34 is provided as a strip that is layered upon a release substrate 40 (e.g., release paper). The particular surface material 38 is shown as a fabric (e.g., a woven scrim of polymeric material). It will be recognized that an individual or automated system can contact the surface material 38 of the part 34 and remove the part 34 from the release substrate 40. Thereafter, the part 34 may be applied to a surface of a member or substrate of an article of manufacture by contacting the adhesive material 36 to that surface and then releasing the part 34. This application of the part 34 is particularly effective if the surface material 38 is substantially non-tacky and the adhesive material is tacky.

Of course, the parts may be applied using other techniques as well. For example, the adhesive material, the surface material or both could be coextruded directly onto a surface of a member of an article of manufacture. As another alternative, multiple different apparatuses such as pumping systems may be used to apply the adhesive material to a surface of a member by itself or a surface material may be applied to the adhesive material thereafter or at the same time. It is also contemplated that an individual or automated system may remove adhesive parts without the surface material from a release substrate and apply the parts to members.

The members to which the adhesive material or part are applied may be configured for installation within a variety of articles of manufacture as discussed. In one preferred embodiment, the adhesive material or part is applied to a member that is to be assembled to an automotive vehicle. Members that may be assembled to an automotive vehicle can include, without limitation, body members (e.g., inner or outer quarter panels, inner or outer panels of a vehicle door, hood, roof, closure panel, a bumper, a pillar, combinations thereof or the like), frame members (e.g., frame rails), engine or chassis components or other members. Other members, which may be assembled to an automotive vehicle include carrier members, which may be used to form baffles, reinforcement members, combinations thereof or the like.

Upon application to a member and thereafter, it may be desirable for the adhesive material or parts to exhibit desired characteristics to allow for further processing or assembly. For example, it may be desirable for the adhesive material or parts to be elastic such that it can be deformed or stretched followed by allowing the material to at least partially regain its original configuration.

In one embodiment, it is preferable for the adhesive material to be relatively easily displaceable such that it causes minimal interference with further processing or assembly steps (e.g., a welding step). In such an embodiment, the adhesive material will typically have a viscosity, at 45° C. and a shear rate of 400 1/s, of at least about 100 poise or less, more typically at least about 200 poise and even more typically at least about 400 poise. The adhesive material also typically has a viscosity, at 45° C. and a shear rate of 400 1/s, of less than about 1500 poise or greater, more typically less than about 1200 poise, even more typically less than about 1000 poise and still more typically less than about 800 poise. Advantageously, provision of the activatable material at such a viscosity can assist the activatable material in whetting surfaces of substrates and/or mating surfaces of substrates or members when such characteristics are desirable.

Such displaceable materials as described herein can be particularly suitable for allowing weld-through. Thus, in one embodiment of the present invention, it is contemplated that the adhesive material or parts are applied to a portion of a member and the portion of the member is subsequently welded. Generally, the member may be welded to another member or welding may be carrier out on the single member. Moreover, the welding may take place prior to, during or after assembly of the member to its article of manufacture (e.g., an automotive vehicle).

Figure 4:
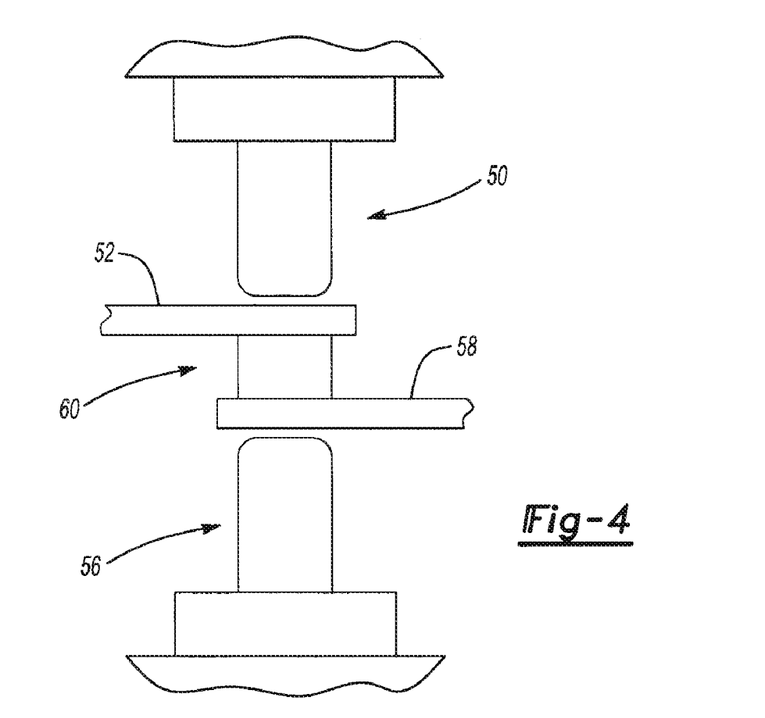
FIG. 4 illustrates an exemplary adhesive material being used for one exemplary application of the present invention.

According to one embodiment, electrical resistance welding is employed, although other techniques may be employed as well. In such an embodiment, as shown in FIG. 4, a first electrode 50 is typically brought into abutting contact with a surface of a first member 52 and a second electrode 56 is typically brought into abutting contact with a surface of a second member 58. Upon such contact, at least a portion of the first member 52 and the second member 58 are located between the electrodes 50, 56. As shown, at least a portion of a mass or part 60 (shown as a strip) with or without surface material is located between the members 52, 58 the electrodes 50, 56 or both. For welding, the electrodes 50, 56 move portions of the members 52, 58 toward each other thereby displacing a portion of the mass or part 60 of adhesive material. Typically the portion of the members 52, 58 contact each other, although not necessarily required. At the same time or thereafter, an electrical current is typically induced to flow between the first electrode 50 and a second electrode 56 thereby forming one or more welds between and/or joining the first member 52 and a second member 58.

Typical weld conditions for such an operation, particularly for automotive members, is an application between about 8 and 14 mA for 4 to 20 cycles of 1/60 of a second with a weld tip pressure of between about 300 and 1000 pounds per square inch. Advantageously, adhesive material and adhesive parts of the present invention can often allow such welding operations to be performed without a shunt, although not necessarily required, and still maintain a relatively high level of weld formation and strength.

After application, the adhesive material is preferably activated to cure (e.g., crosslink), expand (e.g., foam) or both as has been described herein. Such activation may occur before welding, when a welding step is employed, but typically occurs thereafter. When the members are part of an automotive vehicle (e.g., body or frame components), the activation typically occurs during paint or coating processing steps (e.g., in an e-coat oven).

If the adhesive material has been applied to a carrier member to form a baffle, a reinforcement member, a seal or the like, the carrier member with the activatably material thereon is typically inserted within a cavity of a structure of an article of manufacture (e.g., an automotive vehicle). After insertion, the adhesive material is typically activated to expand, cure or both thereby adhering the carrier to the structure (e.g., within a cavity thereof) of the article for forming a baffling, sealing or reinforcement system. Alternatively, if the adhesive material has been applied to other members of an article of manufacture (e.g., members of an automotive vehicle) as discussed herein, the adhesive material may be activated to expand, cure or both and form a seal, a reinforcement, a baffle, a sound absorption system, a combination thereof or the like.

After activation and depending upon the intended use of the adhesive material, the material will typically exhibit one or more desired characteristics such as strength, sound absorption, vibration dampening, combinations thereof or the like. In one exemplary embodiment, which is particularly useful for structural adhesion, the adhesive material can exhibit a shear strength (e.g., a lap shear strength) greater than about 500 psi, more typically greater than about 1000 psi, even more typically greater than about 1500 psi and still more typically greater than about 2200 psi. Such lap shear strength can be determined according to ASTM D 1002-01 or a more recent version ASTM D 1002-05 titled Apparent Shear Strength of Single-Lap-Joint Adhesively Bonded Metal Specimens by Tension Loading (metal-to-metal). Advantageously, the adhesive can often continue to exhibit such characteristics even when the adhesive material is applied as a part with surface material thereon.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming an adhesive part for providing sealing, structural adhesion, baffling, reinforcement or a combination thereof to a member, the method comprising:
   providing the adhesive material wherein the adhesive material includes:
   i. a curing agent;
   ii. at least about 12% by weight of an epoxy/elastomer adduct;
   iii. one or more epoxy resins, wherein at least 60% by weight of the epoxy resins are liquid epoxy resins;
   iv. a conductive filler;
   applying a surface material to a surface of the adhesive material for forming the adhesive part such that the part includes a handling surface wherein:
   the surface material is a weldable conductive structural film including a conductive filler that comprises at least about 10% of the surface material
   applying the adhesive material to a surface of the member;
   performing a weld operation upon the member, the weld operation displacing at least a portion of the adhesive material; and
   activating the adhesive material to cure and/or crosslink the adhesive material.

2. A method as in claim 1 further comprising applying a release substrate to the adhesive material and transporting the part.

3. A method as in claim 1 wherein the adhesive material includes greater than about 15% by weight liquid epoxy and an epoxy/elastomer adduct wherein an epoxy component, an elastomer component, or both of the epoxy elastomer adduct is liquid at about room temperature.

4. A method as in claim 1 wherein the adhesive material has a viscosity of at least about 100 poise and less than about 1500 poise at a temperature of 45 ° C. and a shear rate of 400 1/s.

5. A method as in claim 1 wherein the adhesive material is expandable, thermosettable or both at an elevated temperature typically experienced in a paint or e-coat oven.

6. A method as in claim 1 further comprising applying the adhesive part to a member of an automotive vehicle.

7. A method of forming an adhesive part for providing sealing, structural adhesion, baffling, reinforcement or a combination thereof to the member, the method comprising:
   providing the adhesive material wherein the adhesive material includes:
   i. a curing agent;
   ii. at least about 12% by weight of an epoxy/elastomer adduct;
   iii. one or more epoxy resins, wherein at least about 60% by weight of the epoxy resins are liquid epoxy resins;
   iv. one or more ethylene polymers;
   v. a conductive filler including graphite;
   applying a surface material to a surface of the adhesive material for forming the adhesive part such that the part includes a handling surface wherein:
   i. the surface material is a weldable structural film including an acid polymer in an amount less than about 60% and greater than about 4% of the weight of the surface material and including a conductive filler that comprises at least about 10% of the surface material;
   ii. the adhesive material has a viscosity of at least about 100 poise and less than about 1500 poise at a temperature of 45 ° C. and a shear rate of 400 1/s;
   applying the adhesive material to a surface of the member, the member being part of an automotive vehicle;
   performing a weld operation upon the member, the weld operation displacing at least a portion of the adhesive material; and
   activating the adhesive material to cure and/or crosslink the adhesive material.

8. A method as in claim 7 further comprising applying a release substrate to the adhesive material.

9. A method as in claim 7 wherein the adhesive material includes greater than about 15% liquid epoxy and an epoxy/elastomer adduct wherein an epoxy component, an elastomer component or both of the epoxy elastomer adduct is liquid at about room temperature.

10. A method as in claim 7 wherein the adhesive material includes conductive material.

11. A method of forming an adhesive part for providing sealing, structural adhesion, baffling, reinforcement or a combination thereof to the member, the method comprising:
    providing the adhesive material wherein the adhesive material includes:
    a curing agent;
    ii. at least about 12% by weight of an epoxy/elastomer adduct;
    iii. one or more epoxy resins, wherein at least 60% by weight of the epoxy resins are liquid epoxy resins;
    iv. one or more ethylene polymers;
    v. a conductive filler including graphite;
    applying a surface material to a surface of the adhesive material for forming the adhesive part such that the part includes a handling surface wherein:
    i. the surface material is a weldable conductive structural film including a conductive filler that comprises at least about 10% of the surface material;
    i. the surface material including an acid polymer in an amount less than about 60% and greater than about 4% of the weight of the surface material;
    ii. the adhesive material has a viscosity of at least about 100 poise and less than about 1500 poise at a temperature of 45 ° C. and a shear rate of 400 1/s;
    applying the adhesive material to a surface of the member, the member being part of an automotive vehicle;
    performing a weld operation upon the member, the weld operation displacing at least a portion of the adhesive material; and
    activating the adhesive material to cure and/or crosslink the adhesive material.

12. A method as in claim 1, wherein the conductive property of the film allows for no shunt welding.

13. A method as in claim 7, wherein the conductive property of the film allows for no shunt welding.

14. A method as in claim 11, wherein the conductive property of the film allows for no shunt welding.

* * * * *